US008670914B2

(12) United States Patent
Fujiki et al.

(10) Patent No.: US 8,670,914 B2
(45) Date of Patent: Mar. 11, 2014

(54) VEHICLE BRAKE CONTROL SYSTEM

(75) Inventors: Noriaki Fujiki, Ebina (JP); Keigo Ajiro, Zama (JP); Takuya Higuchi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/641,578

(22) PCT Filed: Apr. 22, 2011

(86) PCT No.: PCT/IB2011/000888
§ 371 (c)(1),
(2), (4) Date: Oct. 16, 2012

(87) PCT Pub. No.: WO2011/132074
PCT Pub. Date: Oct. 27, 2011

(65) Prior Publication Data
US 2013/0041565 A1    Feb. 14, 2013

(30) Foreign Application Priority Data
Apr. 23, 2010  (JP) .................................. 2010-099677

(51) Int. Cl.
*G06F 7/70*    (2006.01)
(52) U.S. Cl.
USPC ......................................................... 701/70
(58) Field of Classification Search
USPC ......................................................... 701/70
See application file for complete search history.

(56) References Cited

U.S. PATENT DOCUMENTS

| 6,142,586 A | 11/2000 | Sakai |
| 2002/0158510 A1 | 10/2002 | Kobayashi et al. |
| 2003/0102673 A1 * | 6/2003 | Nada ............................ 290/40 C |
| 2003/0168266 A1 | 9/2003 | Sasaki et al. |
| 2003/0173826 A1 | 9/2003 | Tazoe et al. |
| 2006/0004507 A1 * | 1/2006 | Teslak et al. ..................... 701/69 |
| 2006/0131956 A1 | 6/2006 | Matsuura et al. |
| 2008/0228367 A1 | 9/2008 | Aoki et al. |
| 2009/0045672 A1 | 2/2009 | Nishino et al. |

FOREIGN PATENT DOCUMENTS

| EP | 1306263 A2 | 5/2003 |
| FR | 2926771 A1 | 7/2009 |
| JP | 2000-270406 A | 9/2000 |
| JP | 2007-283836 A | 11/2007 |
| WO | WO-2009/022211 A1 | 2/2009 |

OTHER PUBLICATIONS

International Search Report (PCT/ISA/210) and Written Opinion of the International Search Authority (PCT/ISA/237) for International Application No. PCT/IB2011/000888, mailed Jun. 21, 2012.
An English Translation of the Japanese Office Action for Patent Application No. 2010-099677 Issued on Oct. 16, 2013.

* cited by examiner

*Primary Examiner* — Muhammad Shafi
*Assistant Examiner* — Michael D Lang
(74) *Attorney, Agent, or Firm* — Global IP Counselors, LLP (57) ABSTRACT

A vehicle brake control system has a braking detector and a braking controller. The braking detector determines whether a braking operation in a vehicle is within an initial braking stage based on a control condition of a frictional braking system. The braking controller performs initial braking stage control during the initial braking stage by controlling a regenerative braking system to provide a limited braking torque and the frictional braking system to provide a supplemental braking torque, the combination of which provides a target braking torque. The braking controller performs subsequent braking control when the initial braking stage ends to provide an increased regenerative braking torque and a lower supplemental braking torque as the target braking torque.

20 Claims, 7 Drawing Sheets

VEHICLE BRAKE CONTROL SYSTEM

CROSS-REFERENCE TO RELATED APPLICATIONS

This application is a U.S. National stage of International Application No. PCT/IB2011/000888, filed Apr. 22, 2011. This application claims priority to Japanese Patent Application No. 2010-099677, filed on Apr. 23, 2010. The entire disclosure of Japanese Patent Application No. 2010-099677 is hereby incorporated herein by reference.

BACKGROUND

1 Field of the Invention

The present invention generally relates to a vehicle brake control system. More particularly, the present invention relates to a vehicle brake control system that cooperatively controls a frictional braking system and a regenerative braking system of a vehicle during an initial stage of braking.

2. Background Information

A cooperative control apparatus for a vehicle brake system is typically configured to perform cooperative control of a frictional braking system and regenerative braking system to provide a target braking torque in response to a braking operation or other vehicle driving state. As appreciated in the art, a vehicle brake system that includes a regenerative braking system and a frictional braking system can be referred to as a combination braking system or simply a combination system. During this cooperative control operation, regenerative braking is preferentially used, especially during the initial state of the braking since the target braking torque is generally small. However, if the target braking torque is increased by an increase in the force of the braking operation, the regenerative braking may not be sufficient to achieve the target braking torque.

When the target braking torque can no longer be supplied solely by regenerative braking due to such factors as a subsequent increase in the target braking torque by an increased braking operation force, a change occurs from a state in which braking is performed solely by regenerative braking to a state in which braking is performed by regenerative braking as well as frictional braking. In this event, the frictional braking is used with the regenerative braking to compensate for the shortfall in braking torque. Accordingly, regenerative braking is used as much as possible, and the use of frictional braking can be kept to a minimum. Therefore, the amount of the kinetic energy of the vehicle that can be recovered as electrical energy by regenerative braking can be maximized while the loss of vehicle kinetic energy as heat due to frictional braking can be minimized. As a result, energy efficiency of the vehicle can be enhanced, which can reduce fuel consumption or electrical consumption by the vehicle.

As understood in the art, a hydraulic frictional braking system typically includes a master cylinder containing one or more pistons, and a brake fluid reservoir. The master cylinder communicates with the brake fluid reservoir via at least one fluid port. When a brake pedal, for example, is depressed, a piston in the master cylinder is moved by a push stroke distance past the fluid port to generate fluid pressure in the brake lines. This fluid pressure operates the frictional brakes to close on the wheel rotor, for example. However, the fluid pressure is typically not generated to an amount sufficient to operate the frictional brakes as desired until after the piston blocks the fluid port. Hence, a delay period may exist between the time that the brake pedal is depressed and the time that the sufficient fluid pressure is generated. This delay period may cause a response delay in the frictional braking operation that tends to be large in comparison with any response delay in the regenerative braking operation. Therefore, when the change occurs from the state of braking solely by regenerative braking during the initial stage of the braking operation to the state of regenerative braking that is supplemented by frictional braking, the frictional braking force may not be applied as rapidly as the regenerative braking force due to the response delay in the frictional braking operation.

Japanese Unexamined Patent Application Publication No. 2007-196924 describes a system that attempts to reduce the delay in the application of a frictional braking force. Specifically, that system applies both a regenerative braking force and a frictional braking force during the initial stage of braking, instead of only applying regenerative braking to provide the target braking torque. Therefore, even when the application of the frictional braking force is delayed, the higher response application of the regenerative braking force can compensate for such a delay.

SUMMARY

However, it has been discovered that in the conventional cooperative control described above, the regenerative braking operation may need to be discontinued when, for example, a failure occurs in sensors that detect the conditions of certain control factors, or when the condenser for storing the electrical power generated by regenerative braking operation is full and cannot be charged. When such an event occurs and the regenerative braking operation is discontinued, the regenerative braking torque decreases rapidly from a large value described above to a lower value or, for example, zero. Furthermore, since the frictional braking force may not be applied as rapidly as desired due to the response delay as discussed above, the deceleration of the vehicle speed may occur slower than expected, which can be uncomfortable for the driver.

Accordingly, because the regenerative braking operation having a rapid response time can be used to compensate for the response delay that occurs during the frictional braking operation, the embodiments of the present invention described herein uses both regenerative braking and frictional braking from the initial stage of the braking operation. However, the embodiment of the present invention employ a control apparatus that eliminates or at least minimizes any delay that may occur in the deceleration of the vehicle even when the regenerative braking torque is rapidly reduced to zero by discontinuing the regenerative braking operation during the initial stage of braking.

In view of the state of the known technology, a vehicle brake control system basically comprises a braking detector component and a braking controller. The braking detector component is configured to determine whether a braking operation occurring in a vehicle is within an initial braking stage based on a condition pertaining to a frictional braking operation that controls a frictional braking system of the vehicle. The braking controller component is configured to provide an initial braking stage control when the braking detector component determines that the braking operation is within the initial braking stage by controlling a regenerative braking system of the vehicle to provide a limited braking torque and the frictional braking system to provide a first supplemental braking torque, such that a combination of the limited braking torque and the first supplemental braking torque corresponds to a target braking torque for decelerating the vehicle. The braking controller component is further configured to provide a subsequent braking control when the braking detector component determines that the initial braking stage has ended by controlling the regenerative braking system to provide an increased braking torque, greater than the limited braking torque, and the frictional braking system to provide a second supplemental braking torque, less than the first supplemental braking torque, such that a combination of the increased braking torque and the second supplemental braking torque corresponds to the target braking torque.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
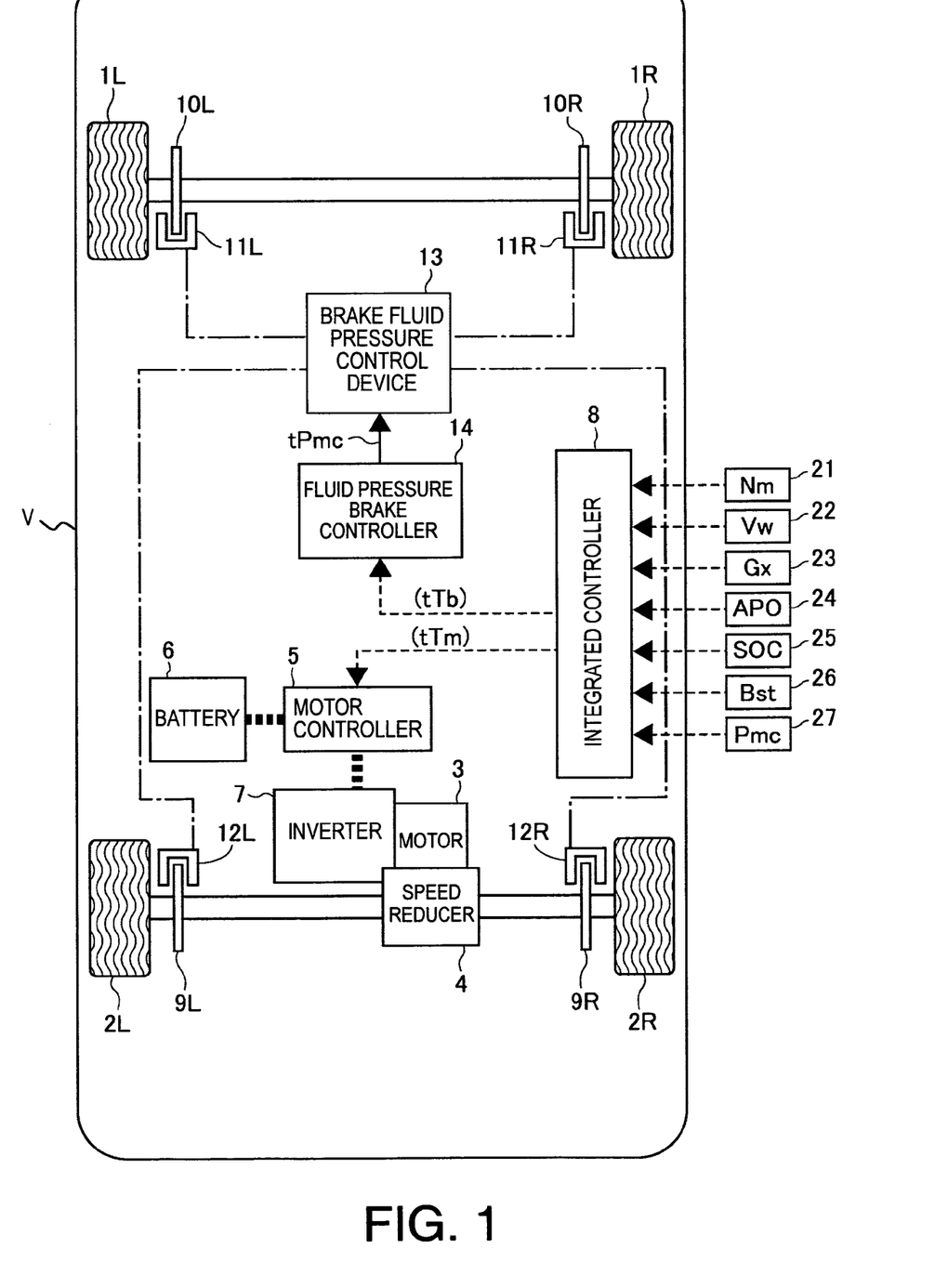
FIG. 1 is a simplified schematic view of a vehicle equipped with a brake control system that includes a cooperative control apparatus according to disclosed embodiments.

FIG. 1 schematically illustrates a vehicle V that is equipped with a control system for a brake system in accordance with a first embodiment. The vehicle V includes a left front wheel 1L, a right front wheel 1R, a left rear wheel 2L and a right rear wheel 2R. In this example, the vehicle V can be an electric vehicle or a hybrid vehicle having a motor 3, such as a rotary electric motor, that is capable of driving the left and right rear wheels 2L and 2R via a speed reducer 4 that includes, for example, a differential gear device.

To control the motor 3, a motor controller 5 converts the electrical power provided by a battery 6, such as a condenser, from direct current into alternating current through the use of an inverter 7, and supplies the alternating-current power to the motor 3 via the inverter 7. Specifically, an integrated controller 8, for example, controls the motor controller 5 to control the motor 3 so that the torque of the motor 3 equals or substantially equals a target motor torque tTm.

When the target motor torque tTm has a negative polarity, the integrated controller 8 controls the motor controller 5 to achieve a regenerative braking effect from the motor 3. For example, the motor controller 5 imparts a power generation load to the motor 3 via the inverter 7 so that the battery 6 is not overcharged. When this occurs, the motor 3 converts the power generated by the regenerative braking effect from alternating current to direct current through the use of the inverter 7 and charges the battery 6.

The electric vehicle V can thus be braked by the regenerative braking described above, as well as by frictional braking. A frictional braking system can include, for example, a hydraulic disc brake device or an air over hydraulic disc brake device. The disc brake device can include brake discs 10L, 10R which rotate together with the left and right front wheels 1L, 1R, respectively, and brake discs 9L, 9R which rotate together with the left and right rear wheels 2L, 2R, respectively. As further shown, individual fluid pressure brake units 11L, 11R and 12L, 12R, such as calipers, are closed to contact both sides of the respective brake discs 10L, 10R and 9L, 9R in the axial direction. The friction generated by the contact between the fluid pressure brake units 11L, 11R and 12L, 12R and the respective brake discs 10L, 10R and 9L, 9R thus frictionally brakes the vehicle V.

That is, the brake units 11L, 11R and 12L, 12R are actuated by brake fluid pressure from a brake fluid pressure control device 13. During control of the brake fluid pressure, a fluid pressure brake controller 14 operates in response to a target frictional braking torque tTb provided from the integrated controller 8, and determines the brake fluid pressure (target master cylinder pressure tPmc) to the brake units 11L, 11R and 12L, 12R to cause the frictional braking torque of the entire vehicle to match the target frictional braking torque tTb. Thus, the fluid pressure brake controller 14 actuates the brake fluid pressure control device 13 so that the prescribed brake fluid pressure is supplied to the brake units 11L, 11R and 12L, 12R to achieve or substantially achieve the target frictional braking torque tTb.

Although the motor controller 5, integrated controller 8 and fluid pressure brake controller 14 are shown in this example as separate components, the features and functionality of the motor controller 5, integrated controller 8 and fluid pressure brake controller 14 can be included in a single controller or a different number of controllers. Furthermore, the motor controller 5, integrated controller 8 and fluid pressure brake controller 14, as well as any other controller discussed herein, each preferably includes a microcomputer with a control program that controls and interacts with the components of the vehicle V as discussed herein. The motor controller 5, integrated controller 8 and fluid pressure brake controller 14, as well as any other controller discussed herein, can also each include other conventional components such as an input interface circuit, an output interface circuit, and storage devices such as a ROM (Read Only Memory) device and a RAM (Random Access Memory) device. The RAM and ROM store processing results and control programs that are run by the motor controller 5, integrated controller 8 and fluid pressure brake controller 14. The motor controller 5, integrated controller 8, fluid pressure brake controller 14 and any other controller discussed herein are operatively coupled to the components of the vehicle V in a conventional manner. It will be apparent to those skilled in the art from this disclosure that the precise structure and algorithms for the motor controller 5, integrated controller 8, fluid pressure brake controller 14 and any other controller discussed herein can be any combination of hardware and software that will carry out the functions of the embodiments discussed herein.

The integrated controller 8, for example, also operates to manage the energy consumption by the entire vehicle V, or at least by the essential components of the vehicle V, so that the vehicle V travels at maximum efficiency or substantially maximum efficiency. For example, the integrated controller 8 receives signal from a motor rotation sensor 21 that indicates the rotational speed Nm of the motor 3, a signal from a wheel speed sensor group 22 that indicates the wheel speed Vw of each of the four wheels 1L, 1R, 2L, 2R, and a signal from a forward/reverse acceleration sensor 23 that indicates a forward/reverse acceleration Gx of the vehicle V. The integrated controller 8 further receives a signal from an accelerator position sensor 24 that indicates the amount of accelerator pedal depression or, in other words, the accelerator position APO. In addition, the integrated controller 8 receives a signal from a storage state sensor 25 that indicates a storage condition SOC of the battery 6, a signal from a brake pedal stroke sensor 26 indicating a brake pedal stroke amount Bst, and a signal from a fluid pressure sensor 27 that indicates a master cylinder pressure Pmc. As will be appreciated from the description herein, the brake pedal stroke sensor 26, the fluid pressure sensor 27 or both can operate as a braking detector component that is configured to determine whether a braking operation occurring in the vehicle V is within an initial braking stage based on a condition pertaining to a frictional braking operation that controls a frictional braking system (e.g., the fluid pressure brake units 11L, 11R and 12L, 12R, the respective brake discs 10L, 10R and 9L, 9R and the brake fluid pressure control device 13) of the vehicle V.

Accordingly, based on the signals mentioned above, the integrated controller 8 can determine, for example, the energy consumption by the entire vehicle V, the target frictional braking torque tTb for the fluid pressure brake controller 14, and the target motor torque tTm (where a negative polarity is a regenerative braking torque) for the motor controller 5 as discussed herein. For instance, the condition can pertain to a fluid pressure that operates the frictional braking system, and the initial braking stage can correspond to a period in which the fluid pressure is below a prescribed pressure amount such that the supplemental braking torque is below a prescribed torque value.

Further details of the brake fluid pressure control device 13 will now be discussed with regard to FIG. 2. As indicated, the brake fluid pressure control device 13 can include a master cylinder 32 which operates in response to a depression stroke of a brake pedal 31 operated by the driver. The master cylinder 32 is provided with a bottomed master cylinder main body 32a. A secondary piston 32b and a primary piston 32c are slidably fitted in sequence from the open end of the bottomed master cylinder main body 32a, and thus define a secondary piston chamber 32d and a primary piston chamber 32e. Return springs 32f and 32g are disposed within the secondary piston chamber 32d and the primary piston chamber 32e, respectively. Hence, the spring reactive forces exerted by return springs 32f and 32g urge the secondary piston 32b and the primary piston 32c, respectively, to the right in FIG. 2 and thus opposite to the force exerted on the primary piston 32c and secondary piston 32b when the brake pedal 31 is depressed.

Figure 2:
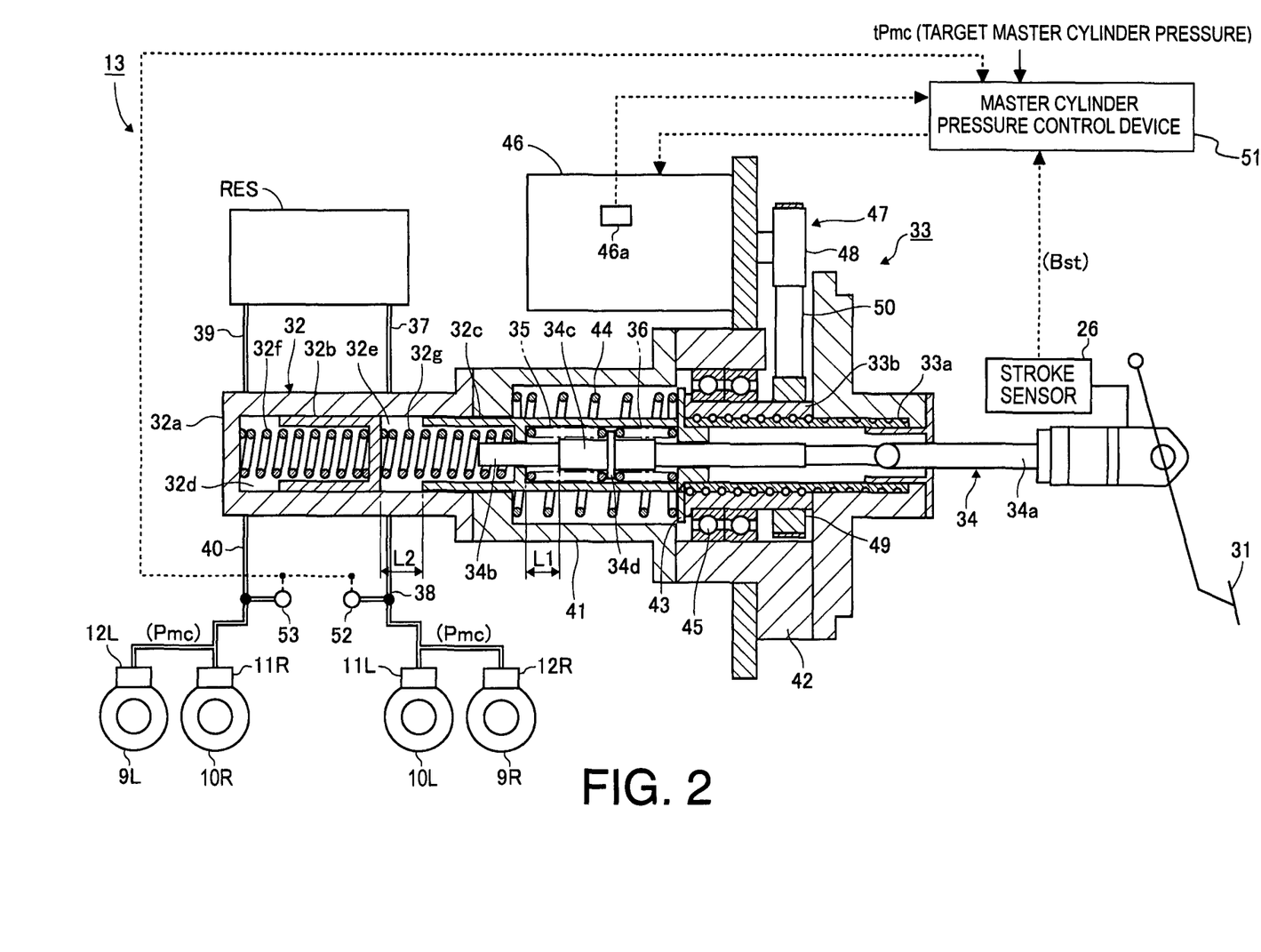
FIG. 2 is a system view showing an example of the brake fluid pressure control device in the vehicle shown in FIG. 1.

The strokes of the secondary piston 32b and primary piston 32c that occur due to the force exerted by return springs 32f and 32g are limited as shown in FIG. 2 by a ball screw shaft 33a of a master cylinder pressure control mechanism 33, such as a brake servo device, that is provided concentrically with the primary piston 32c and the secondary piston 32b. An input rod 34 is provided so as to penetrate through the center part of the master cylinder pressure control mechanism 33. An external end 34a of the input rod 34 protrudes from the master cylinder pressure control mechanism 33 and is coupled to the brake pedal 31. An internal end 34b of the input rod 34 that is on the opposite side of the external end 34a slidably passes through the primary piston 32c with a fluid-tight seal being formed between the primary piston 32c and the internal end 34b.

Furthermore, a large-diameter portion 34c of the input rod 34 is present at the internal end part near the internal end 34b, and an external peripheral flange 34d extends from the periphery of the large-diameter portion 34c. One end of each of the springs 35 and 36 is seated on either side of the external peripheral flange 34d in the radial direction of the external peripheral flange 34d. The other end of the spring 35 is seated on the primary piston 32c, and the other end of the spring 36 is seated on the ball screw shaft 33a of the master cylinder pressure control mechanism 33. The input rod 34 is thus normally elastically supported in a middle position at which the spring forces of the springs 35 and 36 are balanced, with respect to the primary piston 32c in contact with the ball screw shaft 33a of the master cylinder pressure control mechanism 33. A stroke gap of L1 exists between the primary piston 32c and the large-diameter part 34c of the input rod 34 in the elastically supported position, and a stroke gap of L2 exists between the secondary piston 32b and the primary piston 32c.

As further shown, the primary piston chamber 32e communicates with a reservoir tank RES through a fluid channel 37. The primary piston chamber 32e also communicates with the brake units 11L, 12R through a fluid channel 38. In addition, the secondary piston chamber 32d communicates with the reservoir tank RES through a fluid channel 39, and with the brake units 12L, 11R through a fluid channel 40. Although not explicitly shown in FIG. 2, additional valves, motor pumps, and actuators for executing anti-skid control and the like are interposed in the fluid channel 38 from the primary piston chamber 32e to the brake units 11L, 12R, and in the fluid channel 40 from the secondary piston chamber 32d to the brake units 12L, 11R. By the operation of the master cylinder 32, the brake fluid in the reservoir tank RES is supplied to the primary and secondary chambers 32e and 32d through the fluid channels 37 and 39, respectively. This brake fluid thus fills the fluid channels 38 and 40 and is provided to the brake units 11L, 12R, 12L and 11R.

As understood in the art, during a braking operation in which the brake pedal 31 is depressed, the input rod 34 is pushed in, and the primary piston 32c and the secondary piston 32b move in the corresponding stroke direction. Thus, when the primary and secondary pistons 32c and 32b pass the communicating ports of the fluid channels 37 and 39 that open into the primary and secondary chambers 32e and 32d, respectively, the primary and secondary pistons 32c and 32b block the communicating ports, and a master cylinder pressure Pmc is generated in the primary and secondary chambers 32e and 32d. This master cylinder pressure Pmc is supplied to the brake units 11R, 11L, 12R and 12L through the fluid channels 38 and 40 as discussed above. In response to the master cylinder pressure Pmc, the brake units 11R, 11L, 12R and 12L press on the corresponding brake discs 10R, 10L, 9R and 9L, respectively, from both sides in the axial direction to generate a predetermined frictional braking force. The amount of frictional braking force is dependent on the actuated fluid pressure that the master cylinder pressure Pmc provides in the brake units 11R, 11L, 12R and 12L.

In addition, the master cylinder pressure control mechanism 33, which can be a brake servo device, boosts the master cylinder pressure Pmc to reduce the pedal force needed on the brake pedal 31 during braking, and enables the master cylinder pressure Pmc to be controlled separately from the braking operation of the driver. The master cylinder pressure control mechanism 33 in this example includes a first housing 41 and a second housing 42 which abut each other in sequence concentrically with the open end of the bottomed master cylinder main body 32a as shown in FIG. 2. The external end of the primary piston 32c is accommodated concentrically in the first housing 41, and the ball screw shaft 33a is non-rotatably inserted in the center part of the second housing 42 and can move in the axial direction. One end of a spring 44 is seated via a spring seat 43 that is attached to an end surface of the ball screw shaft 33a, and the other end of the spring 44 is seated on the first housing 41. Accordingly, the spring 44 urges the ball screw shaft 33a to the right in FIG. 2 and thus opposite to the force exerted on the input rod 34 when the brake pedal 31 is depressed.

As further shown, a ball screw nut 33b is screwed on the external periphery of the ball screw shaft 33a via a ball, and the external periphery of the ball screw nut 33b is removably supported by a bearing 45 so as to be fixed in position in the axial direction and able to rotate on the internal periphery of the second housing 42. The ball screw nut 33b can be rotationally driven by a master cylinder pressure control motor 46. Thus, the ball screw nut 33b and the master cylinder pressure control motor 46 are drive-coupled by a speed reduction mechanism 47.

The speed reduction mechanism 47 in this example, includes a small-diameter drive pulley 48 which is fixed to an output shaft of the master cylinder pressure control motor 46; a large-diameter driven pulley 49 which is fixed to the external periphery of the ball screw nut 33b; and a belt 50 which passes around the small-diameter drive pulley 48 and the large-diameter driven pulley 49. When the large-diameter driven pulley 49 is rotated by the master cylinder pressure control motor 46 via the speed reduction mechanism 47, the ball screw nut 33b rotates in integral fashion. The ball screw shaft 33a is translationally moved in an axial direction of the ball screw shaft 33a by the rotational movement of the ball screw nut 33b.

When the ball screw shaft 33a moves translationally to the left in FIG. 2, the primary piston 32c is pushed in the same direction by the thrust of the ball screw shaft 33a so as to increase the master cylinder pressure Pmc. Also, when the ball screw shaft 33a moves translationally to the right in FIG. 2, the primary piston 32c reduces the master cylinder pressure Pmc by the return stroke in the same direction. FIG. 2 shows a state in which the ball screw shaft 33a is in the initial position of the stroke, and thus furthest to the right when the brake pedal 31 is not being pressed. Also, the return force of the spring 44 is continuously imposed on the ball screw shaft 33a.

Therefore, even when the master cylinder pressure control motor 46 fails and stops while the master cylinder pressure Pmc is being generated during a braking operation when the brake pedal 31 is depressed, and the return stroke of the ball screw shaft 33a can no longer be controlled, the ball screw shaft 33a is pushed back by the spring 44 so as to be able to return to the initial position as shown in FIG. 2. Hence, when the braking operation is stopped by releasing of the brake pedal 31, the master cylinder pressure Pmc can decrease to zero, and dragging due to residual frictional braking force can be prevented.

In addition, the rotational positioning of the motor 46 to reduce the master cylinder pressure Pmc via the abovementioned translational movement of the ball screw shaft 33a can be controlled by a master cylinder pressure control device 51 that can be included, for example, in the brake fluid pressure control device 13. That is, the master cylinder pressure control device 51 receives the signal from the brake pedal stroke sensor 26 described above with reference to FIG. 1. The master cylinder pressure control device 51 can further receive a signal relating to the target master cylinder pressure tPmc, a signal from a resolver or other motor rotation angle detection sensor 46a that detects the rotation angle of the motor 46, and signals from fluid pressure sensors 52 and 53 that detect the brake unit actuation pressure in the fluid channels 38 and 40. The master cylinder pressure control device 51 can compute the stroke position of the ball screw shaft 33a on the basis of the rotation angle of the motor 46 as detected by the motor rotation angle detection sensor 46a. Also, the master cylinder pressure control device 51 can determine the degree to which the thrust of the input rod 34 is to be amplified or, in other words, the degree to which the master cylinder pressure Pmc is to be controlled, based on the input signals, and controls the rotation angle of the motor 46 to achieve this amplification.

During this controlling operation, the master cylinder pressure control device 51 controls the stroke displacement of the primary piston 32c according to the stroke of the input rod 34, that is, the relative displacement of the input rod 34 and the primary piston 32c, through the use of the motor 46. Specifically, the master cylinder pressure control device 51 operates the motor 46 to displace the primary piston 32c from the braking operation position determined by the brake pedal 31 in response to the target master cylinder pressure tPmc that corresponds to the target frictional braking torque described above with reference to FIG. 1. Thus, the master cylinder pressure control device 51 can control the master cylinder pressure Pmc to equal or substantially equal the target master cylinder pressure tPmc.

The thrust amplification ratio of the input rod 34, which can also be referred to as the fluid pressure servo ratio α, can be determined at this time as shown below by such factors as the ratio of the pressure-receiving surface areas AIR and APP of the input rod 34 and the primary piston 32c, respectively. For example, the fluid pressure of the primary piston chamber 32e can be determined according to Equation (1) below $$Pmc=(FIR+K\times\Delta x)/AIR=(FPP-K\times\Delta x)/APP \quad (1)$$

Wherein,

Pmc: Fluid pressure (master cylinder pressure) of the primary piston chamber 32e;

FIR: Thrust of the input rod 34;

FPP: Thrust of the primary piston 32c;

AIR: Pressure-receiving surface area of the input rod 34;

APP: Pressure-receiving surface area (AIR<APP) of the primary piston 32c;

K: Spring constant of the springs 35 and 36; and

Δx: Relative displacement amount of the input rod 34 and the primary piston 32c.

The relative displacement amount Δx described above can be defined according to the equation Δx=Xb−Xi, where Xi is the displacement (input rod stroke) of the input rod 34, and Xb is the displacement (piston stroke) of the primary piston 32c. Thus, Δx is zero at the middle position of relative movement, Δx has a positive sign when the primary piston 32c advances in the pushing direction (stroke to the left in FIG. 2) with respect to the input rod 34, and Δx has a negative sign when the primary piston 32c retreats (stroke to the right in FIG. 2) in the opposite return direction. Also, the sliding resistance of the seal is ignored in the pressure equilibrium Equation (1) shown above, and the thrust FPP of the primary piston 32c can be estimated from the current value of the motor 46.

Accordingly, the servo ratio α can be indicated by Equation (2) below.

$$\alpha = Pmc\times(APP+AIR)/FIR \quad (2)$$

When the Pmc from Equation (1) above is substituted into Equation (2), the servo ratio α is obtained by Equation (3) below.

$$\alpha = (1 + K \times \Delta x / FIR) \times (AIR + APP)/AIR \quad (3)$$

In servo control, the motor 46 (piston stroke Xb) is controlled so that the target master cylinder pressure characteristic is obtained. The term "master cylinder pressure characteristic" refers to the variation characteristic of the master cylinder pressure Pmc with respect to the input rod stroke Xi.

A target displacement amount computation characteristic thus can be obtained, which indicates the variation of the relative displacement amount Δx with respect to the input rod stroke Xi. The target displacement amount computation characteristic corresponds to the above-mentioned target master cylinder pressure characteristic and the stroke characteristic which indicates the piston stroke Xb with respect to the input rod stroke Xi. The target value, which can be referred to as the target displacement amount Δx*, of the relative displacement amount Δx is computed based on the target displacement amount computation characteristic data obtained by verification. In other words, the target displacement amount computation characteristic indicates the variation characteristic of the target displacement amount Δx* with respect to the input rod stroke Xi, and a single target displacement amount Δx* is determined in correspondence with the input rod stroke Xi. By controlling the rotation of the motor 46, which corresponds to the displacement amount Xb of the primary piston 32c, so as to supply the target displacement amount Δx* determined in correspondence with the detected input rod stroke Xi, the master cylinder 32 can generate a master cylinder pressure Pmc of a magnitude corresponding to or substantially corresponding to the target displacement amount Δx.

It should also be noted that the input rod stroke Xi can be detected by the brake pedal stroke sensor 26 and the piston stroke Xb can be computed based on the signal of the motor rotation angle detection sensor 46a. Also, the relative displacement amount Δx can be calculated from the difference of the abovementioned detected or computed displacement amount. More specifically, during servo control, the target displacement amount Δx* is set based on the detected displacement amount Xi and the target displacement amount computation characteristic, and the motor 46 is controlled by feedback control so that the detected or computed relative displacement amount Δx equals or substantially equals the target displacement amount Δx*. During constant servo control, the input rod 34 and the primary piston 32c are displaced in integral fashion. That is, the primary piston 32c is in the middle position with respect to the input rod 34, and the motor 46 is controlled so that displacement occurs with the relative displacement amount Δx being maintained equal to or substantially equal to zero.

In a situation where the primary piston 32c is caused to stroke so that Δx=0, the servo ratio α is uniquely determined as α=(AIR+APP)/AIR by Equation (3) above. By setting AIR and APP on the basis of the necessary servo ratio and controlling the primary piston 32c so that the displacement amount Xb is equal to the input rod stroke Xi, an always-constant or substantially always-constant servo ratio, such as the necessary servo ratio described above, can be obtained.

Figure 3:
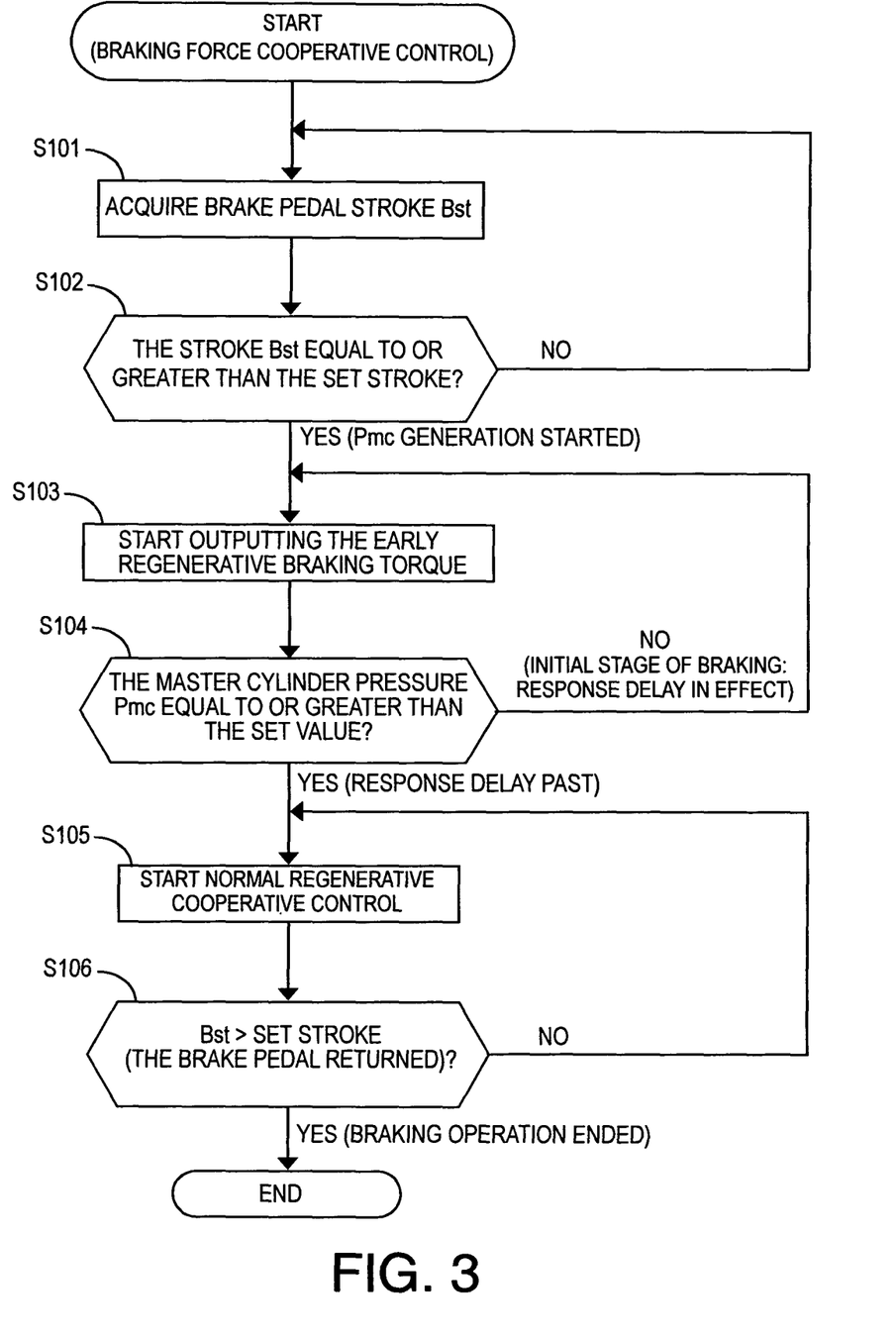
FIG. 3 is a flowchart showing an example of operations performed by the braking force control program executed by, for example, the integrated controller of the brake control system in the vehicle shown in FIG. 1 according to a first disclosed embodiment.

According to a first disclosed embodiment, the integrated controller 8, for example, shown in FIG. 1 can execute the exemplary operations of a control program as shown in FIG. 3 to calculate the target regenerative braking torque tTm and the target frictional braking torque tTb in order to control the braking force control. It should also be noted that any of the exemplary operations of the control programs discussed herein can be performed by the integrated controller 8, the motor controller 5, the fluid pressure brake controller 14 or any combination of these controllers or any other controllers on the vehicle V. Hence, the integrated controller 8, the motor controller 5, the fluid pressure brake controller 14 or any combination of these controllers or any other controllers on the vehicle V can be referred to as a braking controller component. For purposes of this example, however, integrated controller 8 is described as performing the operations associated with the control programs.

In step S101, the integrated controller 8 acquires the brake pedal stroke Bst detected by the sensor 26. In step S102, the integrated controller 8 determines whether the brake pedal stroke Bst is equal to or greater than a set stroke. The set stroke in this example corresponds to the brake pedal stroke that occurs when the primary piston 32c and secondary piston 32b of the master cylinder 32 reach the communicating ports of fluid channels 37 and 39 that open into the primary piston chamber 32e and secondary piston chamber 32d, respectively, and the master cylinder pressure Pmc begins to be generated within the primary and secondary piston chambers 32e and 32d by the blockage of the communicating ports as discussed above.

Until a determination is made in step S102 that the brake pedal stroke Bst is equal to or greater than the set stroke, that is, until a determination is made that generation of the master cylinder pressure Pmc has begun, processing is returned to step S101. The integrated controller 8 continues to acquire the brake pedal stroke Bst until the integrated controller 8 determines in step S102 that the acquired brake pedal stroke Bst is equal to or greater than the set stroke.

When the integrated controller 8 determines in step S102 that the brake pedal stroke Bst is equal to or greater than the set stroke or, in other words, the integrated controller 8 determines that generation of the master cylinder pressure Pmc has begun, the processing continues to step S103. In step S103, the integrated controller 8 sets an early regenerative braking torque as the target regenerative braking torque tTm so as to initiate output of an early regenerative braking torque as described below.

Figure 4:
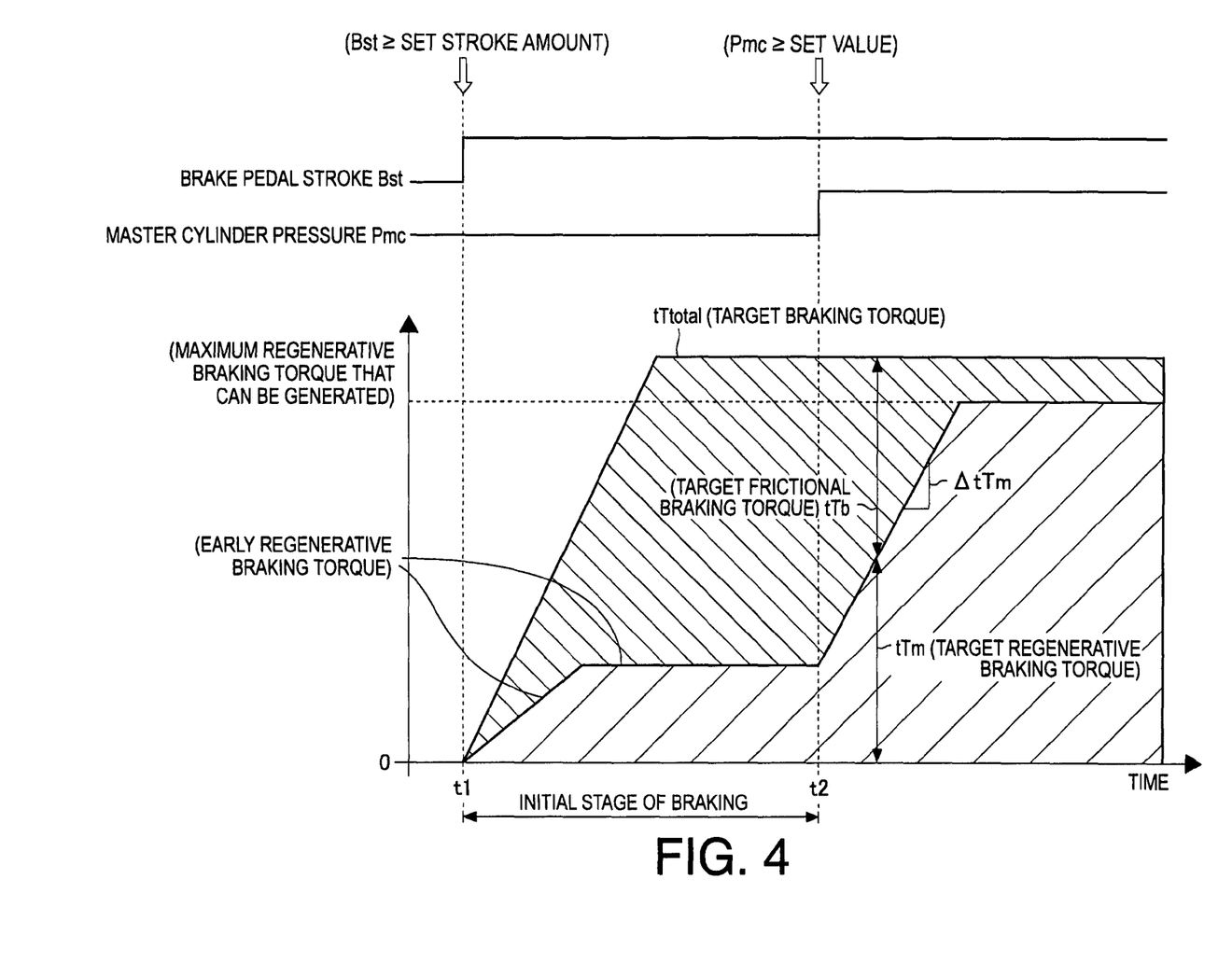
FIG. 4 is an exemplary timing chart pertaining to the operations performed by the braking force control program as shown in FIG. 3.

An example of the target braking torque with respect to time that occurs in shown in FIG. 4. That is, time t1 corresponds to the time detected in step S102 when the brake pedal stroke Bst is determined to be equal to or greater than the set stroke. As indicated, the master cylinder pressure Pmc is generated, and the target braking torque tTtotal rises over time in response to depression of the brake pedal 31 during step S103.

During this control process, the target braking torque tTtotal required by the driver is calculated from the brake pedal stroke Bst, and the target regenerative braking torque tTm is determined so that the target braking torque tTtotal is preferentially supplied during this period by performing regenerative braking. That is, the maximum regenerative braking torque that can be generated is determined from the vehicle speed, the battery storage rate SOC, and other factors. When the maximum regenerative braking torque that can be generated is equal to or greater than the target braking torque tTtotal, the target regenerative braking torque tTm is set to the same or substantially the same value as the target braking torque tTtotal. Accordingly, the target braking torque tTtotal is supplied solely by regenerative braking.

However, in a case in which the maximum regenerative braking torque that can be generated is less than the target braking torque tTtotal, the target regenerative braking torque tTm is set to the same or substantially the same value as the maximum regenerative braking torque that can be generated. Also, the target frictional braking torque tTb is set to the same or substantially the same value as the difference or shortfall between the maximum regenerative braking torque that can be generated and the target braking torque tTtotal. Thus, the integrated controller 8 can perform frictional braking to compensate for the braking torque shortfall that cannot be met solely by regenerative braking. The target braking torque tTtotal is thus supplied by regenerative braking and frictional braking as discussed in more detail below.

It should be noted that the integrated controller 8 uses regenerative braking as much as possible, and keeps the use of frictional braking to a minimum. By doing this, the amount of the kinetic energy of the vehicle V that is recovered as electrical energy by regenerative braking can be maximized the loss of vehicle kinetic energy as heat due to frictional braking can be minimized. As a result, energy efficiency can be enhanced, and fuel consumption or electrical consumption can be reduced.

Since the target braking torque tTtotal is generally small in the initial stage of braking immediately after the start of braking when the brake pedal 31 is depressed, the target braking torque tTtotal can be supplied solely by regenerative braking, and frictional braking need not be performed. However, when the target braking torque tTtotal can no longer be supplied solely by regenerative braking because, for example, the target braking torque tTtotal is increased due to an increase in the pedal force or braking operation force of the brake pedal, a change occurs from a state of braking solely by regenerative braking to a state of braking by regenerative braking as well as frictional braking.

As discussed in the Background section above, during frictional braking, a sufficient master cylinder pressure Pmc is not generated until after the primary and secondary pistons 32c and 32b of the master cylinder 32 have blocked the communicating ports of the fluid channels 37 and 39 that open into the primary and secondary piston chambers 32e and 32d, respectively. Accordingly, the response delay that occurs before braking force is generated relatively large in comparison with any delay that may occur during regenerative braking. Therefore, the braking force may not increase to a desired amount as rapidly as when regenerative braking is being performed.

To avoid or at least reduce this issue, the integrated controller 8 can set an early regenerative braking torque as the target regenerative braking torque tTm in step S103, which can be referred to as the initial stage of braking that occurs between time t1 and time t2 shown in FIG. 4. The target braking torque tTtotal is supplied by the co-action of regenerative braking and frictional braking. Through this cooperative control in the initial stage of braking, even when the generation of frictional braking force is delayed by the response delay that occurs during frictional braking, the high-response regenerative braking can compensate for the delay in braking force generation. However, in a case as discussed in the Background section above in which the regenerative braking torque changes rapidly from a sufficient value to zero, the deceleration of the vehicle speed may occur slower than expected, which can be uncomfortable for the driver.

Accordingly, in step S103, the early regenerative braking torque is set as the target regenerative braking torque tTm having a limited regenerative braking torque value to avoid a sudden decrease in the deceleration of the vehicle. That is, a braking torque value is used that corresponds to the smaller of a braking torque amount that is a predetermined percentage of the target braking torque tTtotal and a set braking torque amount within the target braking torque tTtotal. Furthermore, in a case in which an anti-skid control device of the vehicle V is actuated, high-response anti-skid control is preferably performed by causing the set braking torque value that is within the target braking torque tTtotal to correspond to or substantially correspond to the braking torque reduction amount by which the braking torque is reduced at the initial stage of actuation of the anti-skid control device. In this case, the braking torque of anti-skid control is initially reduced by discontinuing the regenerative braking. Also, the set braking torque amount can be varied within the target braking torque tTtotal according to the storage state SOC of the battery 6 for storing regenerative power, so that the battery 6 is not damaged by overcharging. In this event, the vehicle deceleration rate is not changed by a decrease in regenerative braking torque due to full charging of the battery 6.

Thus, as can be appreciated from the above, the braking controller component, such as the integrated controller 8, is configured to provide an initial braking stage control when the braking detector component, such as the fluid pressure sensor 27, determines that the braking operation is within the initial braking stage by controlling a regenerative braking system of the vehicle V to provide a limited braking torque and the frictional braking system to provide a first supplemental braking torque. A combination of the limited braking torque and the first supplemental braking torque corresponds to a target braking torque for decelerating the vehicle V.

In step S104, the integrated controller 8 determines whether the brake pedal 31 is fully depressed and the master cylinder pressure Pmc, which can be referred to as the frictional braking torque, is equal to or greater than the set value. The set value of the master cylinder pressure Pmc or frictional braking torque is a set value for determining whether the initial stage of braking is over and the response delay of frictional braking would thus no longer be a potential problem. Also, the set value is determined by taking into account possible errors such as differences in resolution or performance of the fluid pressure sensors 52 and 53 (see FIG. 2) so that completion of the initial stage of braking can be reliably determined.

If the integrated controller 8 determines in step S104 that the master cylinder pressure Pmc (frictional braking torque) is less than the set value, which indicates that the initial stage of braking is not yet past, the control process returns to step S103. Accordingly, the integrated controller 8 continues to perform the braking control discussed above with regard to step S103.

However, when the integrated controller 8 determines in step S104 that the master cylinder pressure Pmc (frictional braking torque) is equal to or greater than the set value, which indicates that the initial stage of braking is over, the process continues to step S105. This occurrence in shown in FIG. 4 at, for example, time t2 at which the master cylinder pressure Pmc or frictional braking torque is equal to or greater than the set value during the initial stage of braking.

In step S105, the integrated controller determines the target regenerative braking torque tTm and the target frictional braking torque tTb by the normal regenerative braking cooperative control operations described above. That is, the target braking torque tTtotal is supplied preferentially by regenerative braking, and the shortfall in braking torque is compensated for by frictional braking.

In step S106, the integrated controller 8 determines whether the brake pedal 31 is returned to a non-braking or rest position by determining whether the brake pedal stroke Bst is less than the set stroke as in step S102. If the integrated controller 8 determines in step S106 that the brake pedal stroke Bst is not less than the set stroke, which indicates that the brake pedal 31 has not returned to the non-braking position, the process returns to step S105 and normal regenerative braking control continues. However, if the integrated controller 8 determines in step S106 that the brake pedal stroke Bst is less than the set stroke, which indicates that the brake pedal 31 has returned to the non-braking position and a braking operation is no longer being performed, the process shown in FIG. 3 ends.

Accordingly, the braking controller component, such as the integrated controller 8, provides a subsequent braking control when the braking detector component (e.g., fluid pressure sensor 27) determines that the initial braking stage has ended by controlling the regenerative braking system to provide an increased braking torque that is greater than the limited braking torque, and controlling the frictional braking system to provide a second supplemental braking torque that is less than the first supplemental braking torque. A combination of the increased braking torque and the second supplemental braking torque thus corresponds to the target braking torque.

As described above, this limited early regenerative braking torque is set to a value such that the deceleration of the vehicle does not impart an uncomfortable sensation to the driver, even regenerative braking is discontinued and the regenerative braking torque changes from the early regenerative braking torque to zero braking torque. For example, as indicated by the time series variation of the target regenerative braking torque tTm from time t1 to time t2 in FIG. 4, the early regenerative braking torque is a braking torque value that corresponds to the smaller of a braking torque amount that is a predetermined percentage of the target braking torque tTtotal and a set braking torque amount within the target braking torque tTtotal. Thus, the frictional braking torque tTb is applied to compensate for the shortfall in braking torque so that the target braking torque tTtotal is met.

At and after time t2, when the master cylinder pressure Pmc (frictional braking torque) is equal to or greater than the set value as determined in step S104, the integrated controller 8 determines the initial stage of braking is past and that the response delay of frictional braking is no longer a potential problem. Hence, the target regenerative braking torque tTm and the target frictional braking torque tTb are determined by normal regenerative braking control in which the target braking torque tTtotal is supplied preferentially by regenerative braking, and the shortfall in braking torque is compensated for by frictional braking. Thus, beginning at time t2, the target regenerative braking torque tTm increases from the above-mentioned limited early regenerative braking torque to the maximum regenerative braking torque that can be generated, or to the target braking torque in a case in which the maximum regenerative braking torque that can be generated is greater than the target braking torque. However, the effects of sudden changes in the high-response regenerative braking torque are preferably reduced at this time by increasing in the target regenerative braking torque tTm gradually at a predetermined time variation ratio $\Delta tTm$ as shown, for example, in FIG. 4. Thus, the braking controller component, such as the integrated controller 8, controls the regenerative braking system to increase from the limited braking torque to the increased braking torque at a prescribed rate when the braking detector component determines that the initial braking stage has ended. The normal control described above with regard to step S105 continues until the brake pedal stroke Bst become less than the set stroke and process shown in FIG. 3 ends.

As can be appreciated from the above, in the initial stage of braking, the response delay of frictional braking is compensated for by high-response regenerative braking by the limited early regenerative braking torque, and the problem of a temporary shortfall in braking force that accompanies the response delay of frictional braking can be overcome. Also, even when the regenerative braking torque is suddenly brought to zero and frictional braking cannot generate braking torque at a sufficiently high response to compensate for the shortfall in regenerative braking torque, since the decrease in the regenerative braking torque is a small between the limited regenerative braking torque value and zero, there is no sharp decrease in deceleration to cause discomfort to the driver.

In addition, because the master cylinder pressure Pmc (frictional braking torque) is used to determine the ending of the initial stage of braking, the determination is made accurate. Moreover, since the limited early regenerative braking torque is set to a braking torque value that corresponds to the smaller of a braking torque amount that is a predetermined percentage of the target braking torque tTtotal, and a set braking torque amount within the target braking torque tTtotal, it is possible to even more reliably eliminate or at least reduce a sudden drop in deceleration that may otherwise occur when the regenerative braking torque rapidly drops to zero. Furthermore, high-response anti-skid control can also be performed by setting the set braking torque amount that is within the target braking torque tTtotal to correspond or substantially correspond to the braking torque reduction amount by which the braking torque is reduced at the initial stage of actuation of the anti-skid control device when the anti-skid control device is actuated. Thus, the braking torque can be reduced during anti-skid control by discontinuing the regenerative braking. That is, the set braking torque amount as discussed above can correspond to a braking torque reduction amount by which an overall braking torque of the vehicle V is reduced at an initial stage of actuation of an anti-skid control device associated with frictional braking system.

Also, since the set braking torque amount within the target braking torque tTtotal is varied according to the storage state SOC of the battery 6 for storing regenerative power, it is possible to prevent the battery 6 from being damaged by overcharging, and to prevent the vehicle deceleration rate from being changed by a decrease in regenerative braking torque due to full charging of the battery 6. Hence, the set braking torque amount discussed above can correspond to a storage state of a condenser in the vehicle for storing regenerative power.

In addition, since the target regenerative braking torque tTm is not until after the initial stage of braking is over, and then increased gradually at a predetermined time variation ratio $\Delta tTm$ as shown in FIG. 4, the frictional braking response delay that may occur during the initial braking stage does not adversely affect the braking operation.

Figure 5:
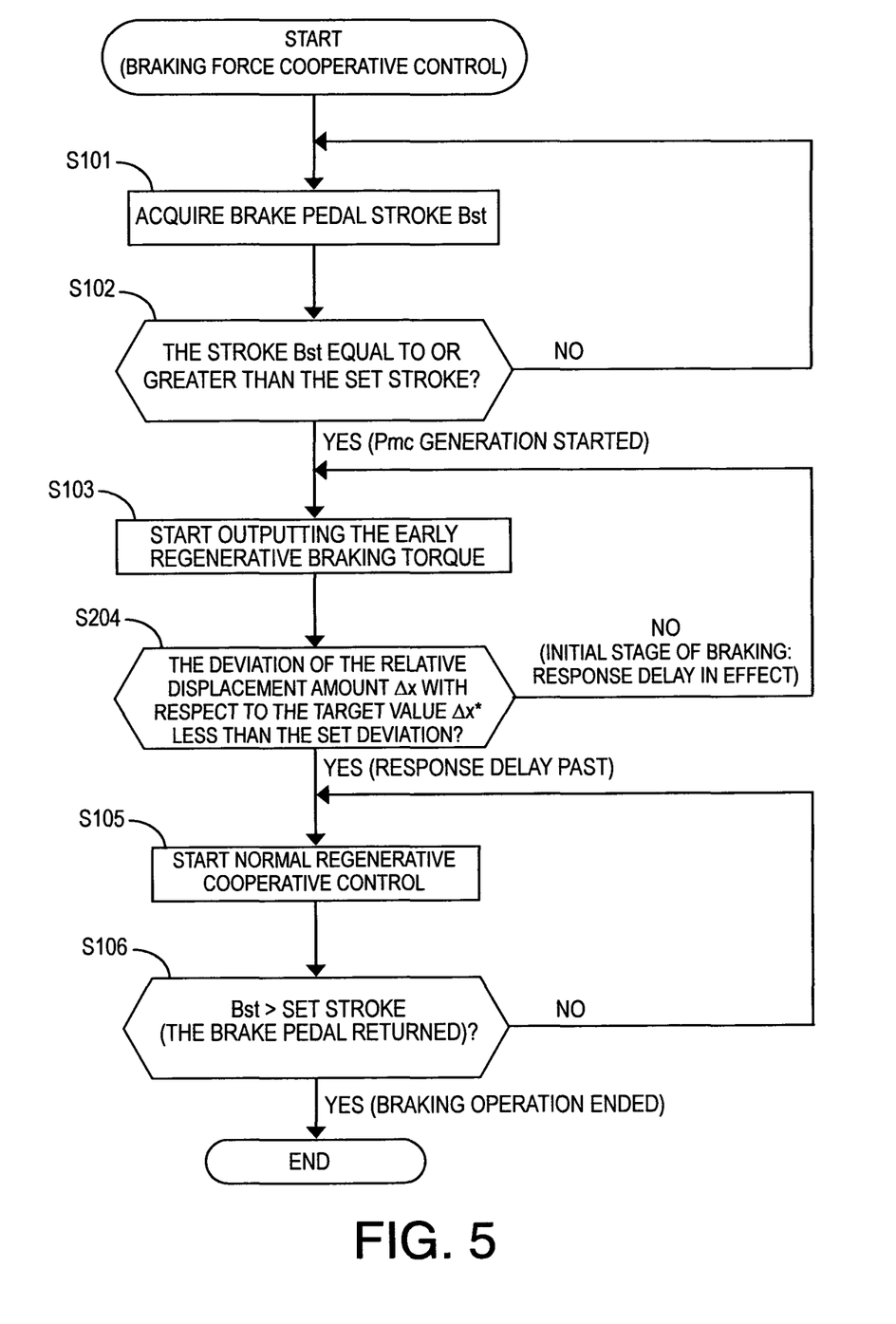
FIG. 5 is a flowchart showing an example of operations performed by the braking force control program executed by, for example, the integrated controller of the brake control system in the vehicle according to a second disclosed embodiment.

FIG. 5 is a flowchart illustrating an example of operations performed by the integrated controller 8 in accordance with a second disclosed embodiment. All other features of the vehicle V and the brake control system are the same as those discussed above with regard to FIGS. 1 and 2. As indicated, the operations shown in FIG. 5 are the same or substantially the same as those shown in FIG. 3 and discussed above except for step S204. Accordingly, the same reference numerals are used for the same operations shown in FIGS. 3 and 5, and no redundant descriptions of such operations are set forth below.

As can be appreciated from FIG. 5, after a determination is made in step S102 that the brake pedal stroke Bst is equal to or greater than the set stroke (i.e., generation of the master cylinder pressure Pmc has begun), braking control is performed based on the early regenerative braking torque in step S103 as discussed above with regard to FIG. 3. However, instead of determining whether the master cylinder pressure Pmc is equal to or greater than a set value as in step S104 of FIG. 3, the integrated controller 8 determines in step S204 whether the deviation of the relative displacement amount Δx (which corresponds to the actual frictional braking torque) of the input rod 34 and the primary piston 32c with respect to the target relative displacement amount Δx* (which corresponds to the target frictional braking torque tTb) is less than a set deviation which is a deviation in the frictional braking torque which corresponds to the target frictional braking torque tTb. The set deviation can be a set value for determining whether the initial stage of braking is over, and the response delay of frictional braking is thus no longer a potential problem. The set value is set by taking into account errors such as differences in resolution or performance of the sensors that relate to the relative displacement amount Δx, so that completion of the response delay of frictional braking can be more reliably determined. Thus, the initial braking stage can correspond to a period in which a deviation between a designated value of a frictional braking torque designated by the braking controller component, such as the integrated controller 8, and an actual value of a frictional braking torque provided by the frictional braking system in response to the designated value is greater than a prescribed deviation value.

When the integrated controller 8 determines in step S204 that the deviation (the deviation of the frictional braking torque with respect to the target frictional braking torque tTb) between the relative displacement amount Δx (actual frictional braking torque) and the target relative displacement amount Δx* (target frictional braking torque tTb) is equal to or greater than the set deviation, the integrated controller 8 determines that the initial stage of braking is not yet over. Accordingly, the process returns to step S103, and braking control is continuously performed to provide the target braking torque tTtotal through the use of the limited target regenerative braking torque tTm (early regenerative braking torque) and the target frictional braking torque tTb which compensates for the braking torque shortfall as discussed above.

However, when the integrated controller 8 determines in step S204 that the deviation (deviation of the frictional braking torque with respect to the target frictional braking torque tTb) between the relative displacement amount Δx (actual frictional braking torque) and the target relative displacement amount Δx* (target frictional braking torque tTb) is less than the set deviation, the integrated controller 8 determines that the initial stage of braking is over. The process thus continues to step S105, and integrated controller 8 determines the target regenerative braking torque tTm and the target frictional braking torque tTb by the normal regenerative braking cooperative control during which the target braking torque tTtotal is preferentially provided by regenerative braking and the shortfall in braking torque is compensated for by frictional braking.

Figure 6:
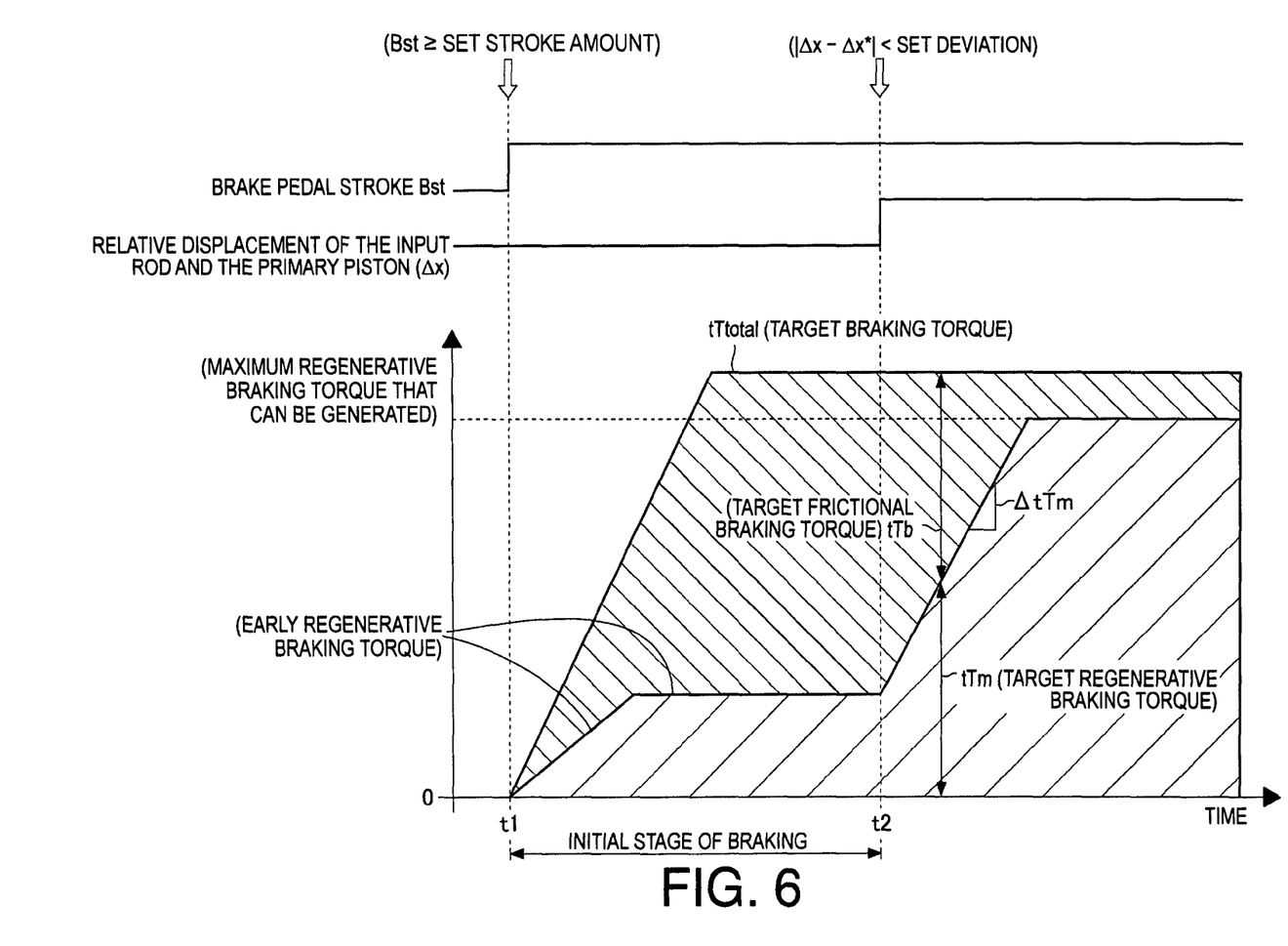
FIG. 6 is an exemplary timing chart pertaining to the operations performed by the braking force control program as shown in FIG. 5.

Thus, as shown in FIG. 6, the target braking torque tTtotal rises in the same or substantially the same manner as in FIG. 4 in response to depression of the brake pedal 31 at time t1 (step S102), at which time the same brake pedal operation as shown in FIG. 4 is performed. Also, at this time, the brake pedal stroke Bst is equal to or greater than the set stroke that causes the master cylinder 32 to generate the master cylinder pressure Pmc.

For a period during time t1 and time t2, the deviation (deviation of the frictional braking torque with respect to the target frictional braking torque tTb) between the relative displacement amount Δx (actual frictional braking torque) and the target relative displacement amount Δx* (target frictional braking torque tTb) is less than the set deviation during the initial stage of braking. In this event, a frictional braking response delay can be a potential problem as discussed above. Therefore, while the target braking torque tTtotal is within the maximum regenerative braking torque that can be generated and tTm=tTtotal, the integrated controller 8 performs the braking control by setting the limited early regenerative braking torque with respect to the target regenerative braking torque tTm, and providing the target frictional braking torque tTb to compensate for any shortfall in the target braking torque (step S103).

As described in the first embodiment, this limited early regenerative braking torque is set to a value such that the deceleration of the vehicle does not impart an uncomfortable sensation to the driver even when regenerative braking is discontinued and the regenerative braking torque falls to zero. As indicated by the time series variation of the target regenerative braking torque tTm from time t1 to time t2 in FIG. 6, the early regenerative braking torque is a braking torque value that corresponds to the smaller of a braking torque amount that is a predetermined percentage of the target braking torque tTtotal and a set braking torque amount within the target braking torque tTtotal.

Beginning at time t2 shown in FIG. 6, when the deviation (deviation of the frictional braking torque with respect to the target frictional braking torque tTb) between the relative displacement amount Δx (actual frictional braking torque) and the target relative displacement amount Δx* (target frictional braking torque tTb) is less than the set deviation (step S204), the integrated controller 8 determines that the initial stage of braking is over. Therefore, the target regenerative braking torque tTm and the target frictional braking torque tTb are determined by normal regenerative braking control where the target braking torque tTtotal is supplied preferentially by regenerative braking, and the shortfall in braking torque is compensated for by frictional braking (step S105).

Accordingly, beginning at time t2, when the target regenerative braking torque tTm is increased from the abovementioned early regenerative braking torque to the maximum regenerative braking torque that can be generated (or to the target braking torque in a case in which the maximum regenerative braking torque that can be generated is greater than the target braking torque) at a predetermined time variation ratio ΔtTm instead of in a stepped manner, sudden changes in the high-response regenerative braking torque have less effect on the deceleration of the vehicle V. The normal braking control performed in step S105 as described above continues until the brake pedal stroke Bst is less than the set stroke and the brake pedal 31 returns to a non-braking or rest position. When the end of the braking operation is confirmed in step S106, the braking control process shown in FIG. 5 ends.

As can be appreciated from the above, the second embodiment is capable of achieving the advantages that are achieved by the first embodiment. In particular, negative effects caused by the response delay that occurs during frictional braking can be eliminated or at least reduced.

Figure 7:
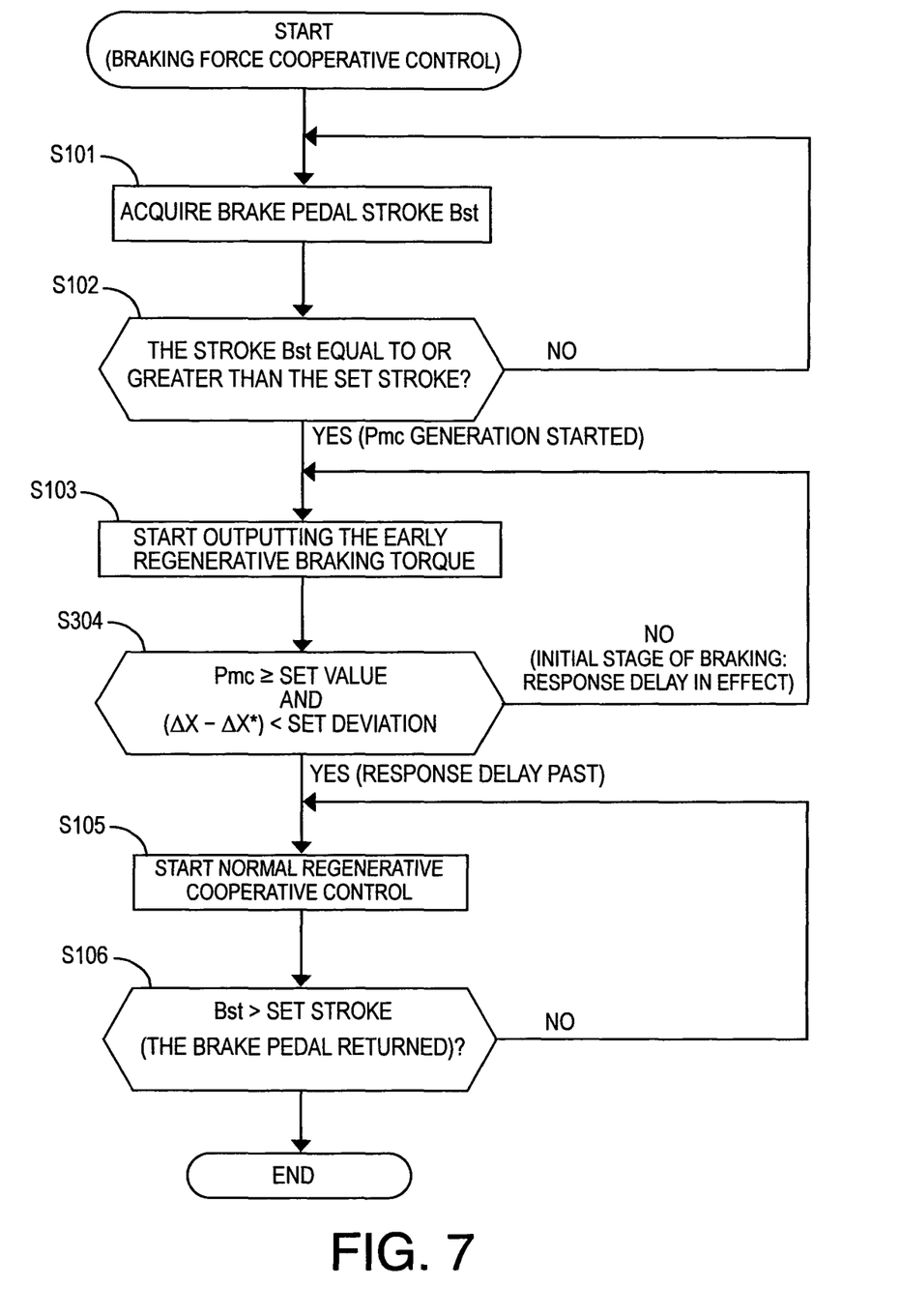
FIG. 7 is a flowchart showing an example of operations performed by the braking force control program executed by, for example, the integrated controller of the brake control system in the vehicle according to a third disclosed embodiment.

FIG. 7 is a flowchart illustrating an example of operations performed by the integrated controller 8 in accordance with a third disclosed embodiment. All other features of the vehicle V and the brake control system are the same as those discussed above with regard to FIGS. 1 and 2. As indicated, the operations shown in FIG. 7 are the same or substantially the same as those shown in FIGS. 3 and 5 and discussed above except for step S304. Accordingly, the same reference numerals are used for the same operations shown in FIGS. 3, 5 and 7, and no redundant descriptions of such operations are set forth below.

As can be appreciated from FIG. 7, after a determination is made in step S102 that the brake pedal stroke Bst is equal to or greater than the set stroke (i.e., generation of the master cylinder pressure Pmc has begun), braking control is performed based on the early regenerative braking torque in step S103 as discussed above with regard to FIGS. 3 and 5. However, instead of determining whether the master cylinder pressure Pmc is equal to or greater than a set value as in step S104 of FIG. 3 or determining whether the deviation of the relative displacement amount Δx of the input rod 34 and the primary piston 32c with respect to the target relative displacement amount Δx* is less than a set deviation in step S204, the process determines in step S304 whether both of the conditions of steps S103 and S204 have been met.

That is, in step S304 of FIG. 7, the integrated controller 8 determines whether the master cylinder pressure Pmc (frictional braking torque) is equal to or greater than the same set value as in step S104 of FIG. 3, and whether the deviation (deviation of the frictional braking torque with respect to the target frictional braking torque tTb) of the relative displacement amount Δx (actual frictional braking torque) of the input rod 34 and the primary piston 32c with respect to the target relative displacement amount Δx* (target frictional braking torque tTb) is less than the same set deviation as in step S204 of FIG. 5. When the two conditions described above are both met, the integrated controller 8 determines that the initial stage of braking is over, and that frictional braking response delay is no longer a problem. However, when any one of the two conditions is not met, the integrated controller 8 determines that the initial stage of braking is not yet over.

As with the processes shown in FIGS. 3 and 5, when the integrated controller 8 determines in step S304 that the initial stage of braking is not yet over, the control process of step S103 is performed as discussed above. Thus, the target braking torque tTtotal is provided through the use of the limited target regenerative braking torque tTm (early regenerative braking torque) and the target frictional braking torque tTb which compensates for any shortfall in regenerative braking torque.

When the integrated controller 8 determines in step S304 that the initial stage of braking is over and thus, the frictional braking response delay of is no longer a problem, the control process proceeds to step S105. In step S105, the target regenerative braking torque tTm and the target frictional braking torque tTb are determined by the normal regenerative braking control in which the target braking torque tTtotal is supplied preferentially by regenerative braking, and the shortfall in braking torque is compensated for by frictional braking as discussed above.

As can be appreciated from the above, the third embodiment is capable of achieving the advantages that are achieved by the first and second embodiments. In particular, negative effects caused by the response delay that occurs during frictional braking can be eliminated or at least reduced. Also, the third embodiment can determine whether the initial braking operation is over more accurately than the first and second embodiments since the third embodiment performs both of the determinations of the first and second embodiments. Hence, the advantages described above can be even more significantly achieved with the third embodiment.

In addition, all of the first through third embodiments operate to set a limited early regenerative braking torque as the target regenerative braking torque tTm during the initial stage of braking, and provide the target braking torque tTtotal by using the early regenerative braking torque and the target frictional braking torque tTb. However, even when a frictional braking response delay causes the actual frictional braking torque to not conform to the target frictional braking torque tTb, and the target braking torque tTtotal is not supplied as intended due to the abovementioned limitations of the target regenerative braking torque tTm, the time of the initial stage of braking is extremely short. Thus, the embodiments still minimize any adverse effects as discussed above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the cooperative control apparatus for a vehicle brake system. Accordingly, these terms, as utilized to describe the present invention should be interpreted relative to a vehicle equipped with the cooperative control apparatus for a vehicle brake system The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A vehicle brake control system comprising:
a braking detector that is configured to determine whether a braking operation occurring in a vehicle is within an initial braking stage based on a condition pertaining to a frictional braking operation that controls a frictional braking system of the vehicle; and a braking controller that is configured to provide an initial braking stage control when the braking detector determines that the braking operation is within the initial braking stage by controlling a regenerative braking system of the vehicle to provide a limited braking torque and the frictional braking system to provide a first supplemental braking torque, such that a combination of the limited braking torque and the first supplemental braking torque corresponds to a target braking torque for decelerating the vehicle, the limited braking torque having a braking torque value that is limited to be smaller than a maximum regenerative braking torque generated by the regenerative braking system, and the braking controller being further configured to provide a subsequent braking control when the braking detector determines that the initial braking stage has ended by controlling the regenerative braking system to provide an increased braking torque, greater than the limited braking torque, and the frictional braking system to provide a second supplemental braking torque, less than the first supplemental braking torque, such that a combination of the increased braking torque and the second supplemental braking torque corresponds to the target braking torque.

2. The vehicle brake control system according to claim 1, wherein
the limited braking torque has the braking torque value corresponding to zero braking torque.

3. The vehicle brake control system according to claim 2, wherein
the condition pertains to a fluid pressure that operates the frictional braking system; and
the initial braking stage corresponds to a period in which the fluid pressure is below a prescribed pressure amount such that the first supplemental braking torque is below a prescribed torque value.

4. The vehicle brake control system according to claim 2, wherein
the initial braking stage corresponds to a period in which a deviation between a designated value of a frictional braking torque designated by the braking controller and an actual value of a frictional braking torque provided by the frictional braking system in response to the designated value is greater than a prescribed deviation value.

5. The vehicle brake control system according to claim 2, wherein
the braking controller is further configured to control the regenerative braking system to increase from the limited braking torque to the increased braking torque at a prescribed rate when the braking detector determines that the initial braking stage has ended.

6. The vehicle brake control system according to claim 1, wherein
the limited braking torque has the braking torque value that corresponds to a smaller of a braking torque amount that is a predetermined percentage of the target braking torque and a set braking torque amount within the target braking torque.

7. The vehicle brake control system according to claim 6, wherein
the set braking torque amount corresponds to a braking torque reduction amount by which an overall braking torque of the vehicle is reduced at an initial stage of actuation of an anti-skid control device associated with frictional braking system.

8. The vehicle brake control system according to claim 7, wherein
the condition pertains to a fluid pressure that operates the frictional braking system; and
the initial braking stage corresponds to a period in which the fluid pressure is below a prescribed pressure amount such that the first supplemental braking torque is below a prescribed torque value.

9. The vehicle brake control system according to claim 7, wherein
the initial braking stage corresponds to a period in which a deviation between a designated value of a frictional braking torque designated by the braking controller and an actual value of a frictional braking torque provided by the frictional braking system in response to the designated value is greater than a prescribed deviation value.

10. The vehicle brake control system according to claim 6, wherein
the set braking torque amount corresponds to a storage state of a condenser in the vehicle for storing regenerative power.

11. The vehicle brake control system according to claim 10, wherein
the condition pertains to a fluid pressure that operates the frictional braking system; and
the initial braking stage corresponds to a period in which the fluid pressure is below a prescribed pressure amount such that the first supplemental braking torque is below a prescribed torque value.

12. The vehicle brake control system according to claim 11, wherein
the initial braking stage corresponds to a period in which a deviation between a designated value of a frictional braking torque designated by the braking controller and an actual value of a frictional braking torque provided by the frictional braking system in response to the designated value is greater than a prescribed deviation value.

13. The vehicle brake control system according to claim 12, wherein
the braking controller is further configured to control the regenerative braking system to increase from the limited braking torque to the increased braking torque at a prescribed rate when the braking detector determines that the initial braking stage has ended.

14. The vehicle brake control system according to claim 10, wherein
the initial braking stage corresponds to a period in which a deviation between a designated value of a frictional braking torque designated by the braking controller and an actual value of a frictional braking torque provided by the frictional braking system in response to the designated value is greater than a prescribed deviation value.

15. The vehicle brake control system according to claim 6, wherein
the condition pertains to a fluid pressure that operates the frictional braking system; and
the initial braking stage corresponds to a period in which the fluid pressure is below a prescribed pressure amount such that the first supplemental braking torque is below a prescribed torque value.

16. The vehicle brake control system according to claim 6, wherein
the initial braking stage corresponds to a period in which a deviation between a designated value of a frictional braking torque designated by the braking controller and an actual value of a frictional braking torque provided by the frictional braking system in response to the designated value is greater than a prescribed deviation value.

17. The vehicle brake control system according to claim 6, wherein
the braking controller is further configured to control the regenerative braking system to increase from the limited braking torque to the increased braking torque at a prescribed rate when the braking detector determines that the initial braking stage has ended.

18. The vehicle brake control system according to claim 1, wherein
the condition pertains to a fluid pressure that operates the frictional braking system; and
the initial braking stage corresponds to a period in which the fluid pressure is below a prescribed pressure amount such that the first supplemental braking torque is below a prescribed torque value.

19. The vehicle brake control system according to claim 1, wherein
the initial braking stage corresponds to a period in which a deviation between a designated value of a frictional braking torque designated by the braking controller and an actual value of a frictional braking torque provided by the frictional braking system in response to the designated value is greater than a prescribed deviation value.

20. The vehicle brake control system according to claim 1, wherein
the braking controller is further configured to control the regenerative braking system to increase from the limited braking torque to the increased braking torque at a prescribed rate when the braking detector determines that the initial braking stage has ended.

* * * * *